United States Patent
Ha et al.

[11] Patent Number: 5,872,515
[45] Date of Patent: Feb. 16, 1999

[54] LAPTOP COMPUTER WITH AN ANTI-THEFT ALARM FUNCTION AND A METHOD OF CONTROLLING THE SAME

[75] Inventors: Ho-Jin Ha, Seoul; Kyong-Kyu Lee, Suwon, both of Rep. of Korea

[73] Assignee: SamSung Electronics Co., Ltd., Suwon, Rep. of Korea

[21] Appl. No.: 814,654

[22] Filed: Mar. 11, 1997

[30] Foreign Application Priority Data

Mar. 20, 1996 [KR] Rep. of Korea ............... 1996 7580
Jul. 26, 1996 [KR] Rep. of Korea ............... 1996 30676

[51] Int. Cl.⁶ ............................................. G08B 13/14
[52] U.S. Cl. ................... 340/571; 340/568; 364/969.3; 380/25; 395/750.05
[58] Field of Search .................................. 340/571, 426, 340/568, 565, 561, 529; 380/25; 364/946, 969.2, 969.3, 969.4; 395/750.05

[56] References Cited

U.S. PATENT DOCUMENTS

| | | | |
|---|---|---|---|
| 4,347,506 | 8/1982 | Duwel et al. | 340/679 |
| 4,815,032 | 3/1989 | Fujii | 364/969.3 |
| 4,918,649 | 4/1990 | Nishimura | 364/969.3 |
| 4,939,706 | 7/1990 | Nose | 368/10 |
| 4,951,249 | 8/1990 | McClung et al. | 380/4 |
| 5,063,496 | 11/1991 | Dayan et al. | 395/750.05 |
| 5,111,185 | 5/1992 | Kozaki | 340/571 |
| 5,138,299 | 8/1992 | Patten et al. | 340/545 |
| 5,375,243 | 12/1994 | Parzych et al. | 380/25 |
| 5,406,261 | 4/1995 | Glenn | 340/568 |
| 5,574,429 | 11/1996 | Streeter | 340/571 |
| 5,578,991 | 11/1996 | Scholder | 340/571 |

*Primary Examiner*—Jeffery A. Hofsass
*Assistant Examiner*—John Tweel, Jr.
*Attorney, Agent, or Firm*—Robert E. Bushnell, Esq.

[57] ABSTRACT

A laptop computer with an alarm function using an LCD on/off switch includes: a microcomputer both for controlling the LCD back-light section on/off operation in response to the on/off state of an LCD on/off switch and for generating an interrupt signal; an alarm processor for determining whether or not the interrupt signal is a burglar alarm signal and outputs an alarm in case of a robbery; and a password determining section for comparing a password entered by a user with a previously set password and interrupting the generation of an alarm only when both passwords are identical. A burglar alarm is sounded when an interrupt occurs so when to indicate a robbery as the LCD on/off switch is turned on against a user's will during the operation of the computer. Also, it can interrupt the alarm by a user inputting a correct password during the generation of the alarm.

12 Claims, 7 Drawing Sheets

LAPTOP COMPUTER WITH AN ANTI-THEFT ALARM FUNCTION AND A METHOD OF CONTROLLING THE SAME

CLAIM OF PRIORITY

This application makes reference to, incorporates the same herein, and claims all benefits accruing under 35 U.S.C. §119 from an application for A COMPACT PERSONAL COMPUTER WITH AN ANTI-THEFT ALARM FUNCTION AND A METHOD OF CONTROLLING THE SAME earlier filed in the Korean Industrial Property Office on 20 Mar., 1996 and there duly assigned Ser. No. 7580/1996, and an application for A COMPACT PERSONAL COMPUTER WITH AN ANTI-THEFT ALARM FUNCTION AND A METHOD OF CONTROLLING THE SAME earlier filed in in the Korean Industrial Property Office on 26 Jul., 1996 and there duly assigned Ser. No. 30676/1996.

BACKGROUND OF THE INVENTION

1. Field of the Invention

The present invention relates to a laptop computer with an anti-theft alarm function, and more particularly, to a laptop computer capable of generating an anti-theft alarm in accordance with a switching signal occurring upon a liquid crystal display (LCD) on/off switch being operated by an unauthorized user and a method of controlling the same.

2. Description of the Related Art

In general, a typical laptop computer has several kinds of functions, such as the turning on/off of an LCD back-light section, a password procedure and a locking/unlocking mode.

A laptop computer is known to be provided with an LCD on/off switch and a keyboard, and LCD cover having an LCD screen, and a main computer body having a front panel for pivotally mounting the keyboard. Such a computer further includes an LCD on/off switch installed on the front panel of the body and capable of turning the LCD screen on or off and a switch compressing projection installed on the LCD cover and capable of pushing down on the LCD on/off switch when the LCD cover is pivotally folded over the upper panel of the main computer body.

If such a laptop computer is not supplied with an externally supplied power source, it may be operated with an internal battery until the internal battery is completely discharged. It is well known in the art that a back-light section of the LCD screen consumes more power than any of the other components of the computer. For this reason, most laptop computers are provided with a power saving circuit to prevent an excessive power consumption during the operation thereof. The power saving circuit allows for the interruption of the supply of power from the battery to the backlight section of the LCD screen when the computer is not in use for a predetermined time, such as, when there is no data provided from the keyboard or a mouse or when the LCD cover is pivotally folded over the main computer body, that is, the LCD on/off switch is pushed down by the switch compressing projection.

In the latter case, battery power can be saved by switching off the back-light section of the LCD screen.

When the switch on the computer is switched off to turn the LCD back/light section off when the LCD cover is pivotally folded over the main computer body, a microcomputer contained within the laptop computer receives data from the keyboard and/or a switching on/off signal from the switch to generate a control signal. A controller for turning the LCD back/light section of the LCD cover on and off in response to the control signal from the microcomputer and a power supply controller for supplying power to the main computer body and the LCD screen and for changing from a previous power mode to a power saving mode in response to the control signal from the microcomputer are also contained within the laptop computer. If the LCD on/off switch is pushed down during the operation of the computer, the microcomputer provides the control signal to the controller to turn the LCD back-light section off. Then, the power supply controller controls the power to the computer and effects a power saving mode in response to the control signal.

The above noted computer may have a password identification function for identifying a previously set password by a user every time it is reset and restarted. This password identification function is provided in the computer to prevent any other person from changing the computer environment which has been previously set by a user. If a password entered by a user is not identical with the previously set password, the laptop computer with the above noted password identification function can not be operated by the unauthorized user. This function may also be performed only in case of a cold booting operation or a warm booting operation. Thus, by such a password identification function, other unauthorized users can not use the computer.

Even when an unauthorized user operates the computer for the purpose of altering the user environment thereof including the previously set password during an authorized user's absence, the computer requires the input of a previously set password at the beginning of the operation thereof. Thus, if a password which is the same as the previously set password is not entered, the computer can not be used by the unauthorized user. The authorized user can, however, enable or disable the password identification function of the computer, and change the password, if necessary.

In addition, the laptop computer further includes an anti-theft function, which is composed of a mechanical and physical locking system therein.

Since the above described functions are independently performed in the computer, the abovenoted computer has some problems in that it can not be prevented from being moved against the user's will and in that it's functions can not be performed simultaneously with one another.

The following patents each disclose features in common with the present invention but do not teach or suggest the specific combination of a laptop computer in which an alarm is sounded when the computer is opened or closed, thereby turning on or off its liquid crystal display, the alarm being turned off by the entry of the proper password on the keyboard of the computer as in the present invention:

U.S. Pat. No. 5,138,299 to Pattern el al., entitled Showcase Alarm System, U.S. Pat. No. 5,578,991 to Scholder, entitled Security System And Method For A Portable Personal Computer, U.S. Pat. No. 4,939,706 to Nose, entitled Transaction Processing Apparatus With A Monitor System For Monitoring Drawer Opening And Closing Conditions, U.S. Pat. No. 4,951,249 to McClung et aL, entitled Method And Apparatus For Controlled Access To A Computer System, and U.S. Pat. No. 4,347,566 to Duwel et al, entitled Electronic Postage Meter Having Check Date Warning With Control For Overriding The Check Date Warning.

SUMMARY OF THE INVENTION

Therefore, it is an object of the invention to provide a laptop computer with an anti-theft alarm function which is capable of generating a burglar warning alarm signal when it is moved to another place against an authorized user's will and with an LCD cover completely folded over a main computer body thereof, and a method of controlling the same.

It is a further object of the invention to provide a laptop computer which can interrupt the generation of a burglar warning alarm only when a password which is the same as a previously set password is entered by an authorized user during the generation of the alarm, and a method of controlling the same.

It is another object of the invention to provide a laptop computer in which LCD back-light on/off, password identification and lock functions can be operated simultaneously with one another so as to prevent the computer from being robbed.

It is an additional object of the invention to provide a laptop computer which, during the generation of a burglar warning alarm, can interrupt the generation thereof by the operation of a specific hot-key only.

It is another object of the invention to provide a laptop computer in which, during the normal operation thereof or the generation of a burglar warning alarm, the supply of power thereto can only be interrupted by the operation of a specific hot-key.

According to one aspect of the present invention, a laptop computer having a main computer body with a microcomputer therein is provided with a keyboard, a liquid crystal display(LCD) pivotally mounted to the main computer body, for displaying information from the microcomputer, and an LCD on/off switch provided to interrupt the supply of power to a back-light section of the LCD cover when the LCD cover is pivotally folded over the main computer body. The computer comprises a means for receiving an interrupt signal from the microcomputer when the LCD on/off switch is off, and for determining whether or not the interrupt signal is a burglar alarm signal so as to generate a warning; and a means for comparing a previously set password with a password entered from the keyboard during the generation of the warning to determine whether or not the former password is identical with the latter password, and for generating a signal to interrupt the generation of the warning.

Preferably, the laptop computer further comprises a BIOS (basic input output system) set-up means for modifying alarm BIOS set-up information, hot-key and password in accordance with key-input information from the keyboard.

In the laptop computer, said LCD on/off switch comprises a contact portion having one terminal connected to ground and another terminal connected to an input port of the microcomputer, and a connection portion pushed down upon the LCD cover being in contact with the main computer body to electrically connect both ends of the contact portion.

According to another aspect of the present invention, a method of controlling an alarm function in a laptop computer having a main computer body with a microcomputer therein and provided with a keyboard, a liquid crystal display (LCD) cover pivotally mounted to the main computer body, for displaying information from the microcomputer, and an LCD on/off switch provided to interrupt the supply of power to a back-light section of the LCD cover when the LCD cover is pivotally folded over the main computer body, an alarm processor for receiving an interrupt signal from the microcomputer when the LCD on/off switch is off, and for determining whether or not the interrupt signal is a burglar alarm signal so as to generate a warning, and a means for comparing a password with a password provided from the keyboard during the generation of the warning to determine whether or not the former password is identical with the latter password, and for generating a signal to interrupt the generation of the warning, comprises the steps of. operating the computer normally; determining whether or not the LCD on/off switch is on; generating a switching on/off signal of the back-light section and an interrupt signal from the microcomputer when switch is on; determining whether or not the interrupt signal is a signal for interrupting the supply of power to the computer; providing the burglar alarm signal as a warning signal to the alarm processor if the interrupt signal is the burglar alarm signal; entering a password from the keyboard while generating the warning signal; determining whether or not the entered password is identical with a previously set password; and supplying a control signal to the alarm processor if the passwords are identical with each other and continuously generating the warning if not, the control signal being a warning interrupt signal to interrupt the generation of the warning.

In the method, the step of determining whether or not the interrupt signal is the burglar alarm signal comprises the step of using the hot-key input signal as a decision factor.

In the method, the step of continuously generating the warning comprises the steps of determining whether or not the interrupt signal is a normal alarm signal or the burglar alarm signal and generating a warning corresponding to each of the alarm signals.

Preferably, the method further comprises the step of interrupting the supply of power to the computer only by means of the hot-key during the normal operation of the computer.

In the method, the step of interrupting the supply of power comprises the steps of receiving a hot-key input signal through the keyboard during the normal operation thereof, determining whether or not the hot-key input signal is provided to control the supply of power to the computer; interrupting the supply of power to the computer if the hot-key input signal is a signal for controlling the supply of power; and determining the interrupt signal to be a burglar alarm signal if not.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF PREFERRED EMBODIMENT

Figure 1:
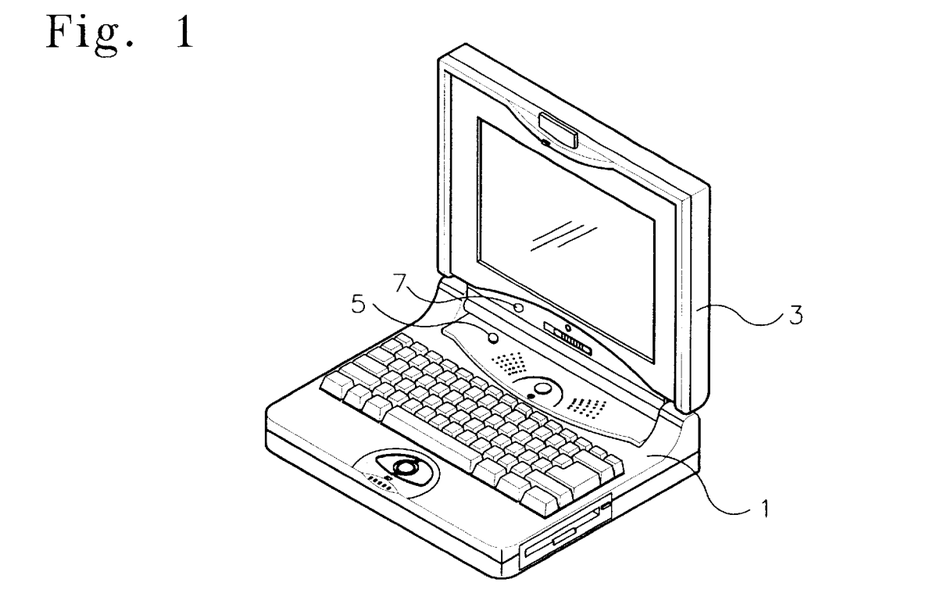
FIG. 1 is a perspective view of a laptop computer with a switch by which an LCD (liquid crystal display) screen is turned on/off.

As shown in FIG. 1, a laptop computer with an LCD on/off switch includes a keyboard, an LCD cover 3 having an LCD screen, and a main computer body 1 having a front panel for pivotally mounting the keyboard. Such a computer further includes an LCD on/off switch 5 installed on the front panel of the body 1 and capable of turning the LCD screen on or off and a switch compressing projection 7 installed on the LCD cover 3 and capable of pushing down on the LCD on/off switch 5 when the LCD cover 3 is pivotally folded over the upper panel of the main computer body 1.

If the laptop computer constructed thus is not supplied with an externally supplied power source, it may be operated with an internal battery until the internal battery is completely discharged. It is well known in the art that a back-light section of the LCD screen consumes more power than any of other components described immediately above. For this reason, most laptop computers are provided with a power saving circuit to prevent an excessive power consumption during the operation thereof The power saving circuit allows for the interruption of the supply of power from the battery to the back-light section of the LCD screen when the computer is not in use for a predetermined time, that is, there's no data provided from the keyboard or a mouse, or when the LCD cover 3 is pivotally folded over the main computer body 1, that is, the LCD on/off switch 5 is pushed down by the switch compressing projection 7.

In the latter case, battery power can be considerably saved by switching off the back-light section of the LCD screen. This is because the switch compressing projection 7 pushes down the LCD on/off switch 5 to turn off the LCD back-light section when the LCD cover 3 is in contact with the front panel of the main computer body 1, and conversely, the projection becomes separated from the LCD on/off switch portion 5 to turn on the LCD back-light section. The above noted laptop computer has, as shown in FIG. 2, a circuit for turning off the LCD back-light section of the LCD screen upon switching on the LCD on/off switch of FIG. 1.

Figure 2:
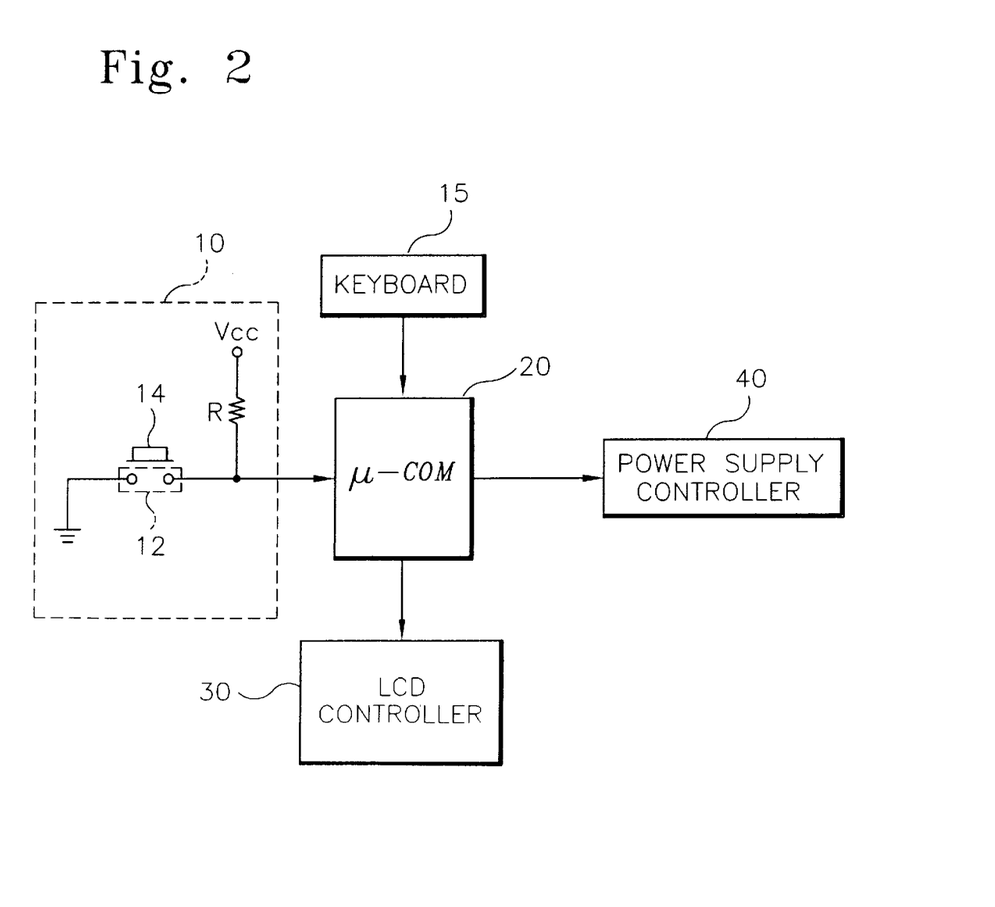
FIG. 2 is a circuit block diagram showing a laptop computer having an LCD on/off switch by which a back-light section within the LCD screen is turned on/off.

Referring to FIG. 2, the laptop computer comprises a switch 10 which is switched off to turn the LCD back-light section off when the LCD cover 3 (shown in FIG. 1) is pivotally folded over the main computer body 1, a microcomputer 20 for receiving data from a keyboard 15 and/or a switching on/off signal from the switch 10 to generate a control signal, a controller 30 for turning on or off the LCD back-light section of the LCD cover 3 on or off in response to the control signal from the microcomputer 20, and a power supply controller 40 for supplying power to the main computer body 1 and the LCD screen (shown in FIG. 1) and for changing from a previous power mode to a power saving mode in response to the control signal from the microcomputer 20. If the LCD on/off switch 10 is pushed down during the operation of the computer, the microcomputer 20 provides the control signal to the controller 30 to turn the LCD back-light section off. Then, the power supply controller 40 controls power to the computer and effects a power saving mode, for example, doze, sleep or suspend, in response to the control signal.

Figure 3:
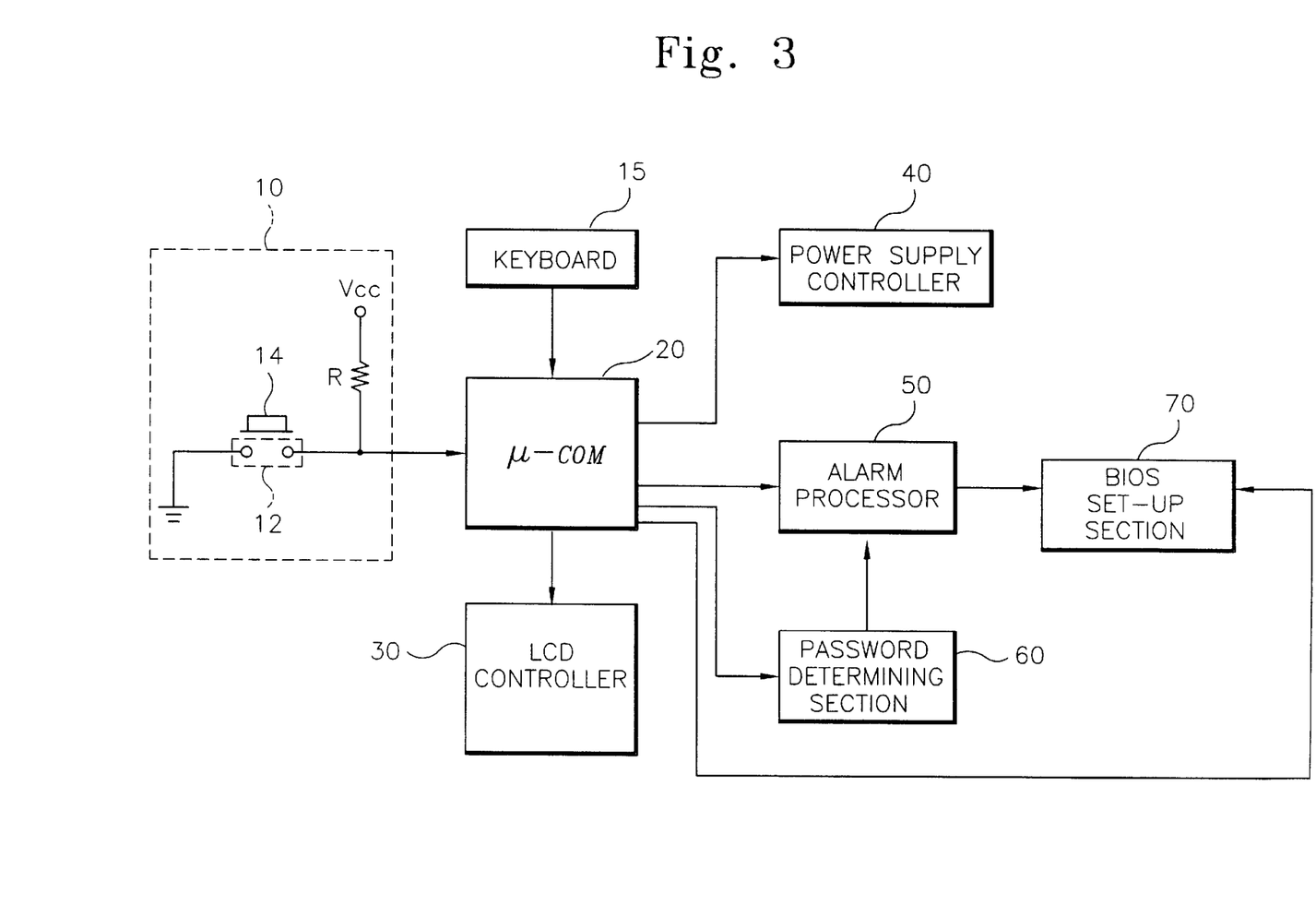
FIG. 3 is a circuit block diagram showing a novel laptop computer with an anti-theft alarm generating function according to the present invention.

Referring to FIG. 3, the novel laptop computer in accordance with the present invention comprises an LCD on/off switch 10, a microcomputer 20 for generating both a control signal for turning on/off an LCD back-light section and an interrupt signal upon switching the switch 10 on/off, an alarm processor 50 for determining whether or not the interrupt signal is a burglar alarm signal and generating a warning alarm (e.g., an anti-theft alarm) if the interrupt signal is discriminated to be the burglar alarm signal, and a password determining section 60 for comparing a previously set password with a new password entered from a keyboard 15 during the generation of the warning alarm and for interrupting the generation of the warning alarm only when the new password is identical with the previously set password. Accordingly, when the switch 10 is toggled against the user's will to be switched off, i.e., when the computer with the LCD cover folded over the main computer body is moved by an unauthorized user, the interrupt signal indicative of a burglar alarm signal is provided from the microcomputer 20 to the alarm processor 50 so as to generate a warning alarm. The laptop computer of the present invention can interrupt the generation of the warning alarm by entering a corresponding password, which is identical with a previously set password.

Referring again to FIG. 3, the LCD on/off switch 10 of the laptop computer has a switch portion and a resistance R which are connected in series between a power source voltage Vcc and ground. The switch portion is composed of a contact portion 12 and a connection portion 14. The contact portion 12 has two electrically separated terminals, one terminal being connected to ground and the other terminal being connected to the resistor R and an input terminal of the microcomputer 20. The connection portion 14 is located to electrically connect the two separated terminals by pushing down the connection portion 14 by the switch compressing projection 7 when the LCD cover 3 is pivotally folded over the main computer body 1 by an unauthorized user, as shown in FIG. 1. If the two terminals of the contact portion 12 are electrically connected to each other, e.g., when the computer is moved by an unauthorized user with the LCD cover in contact with the upper panel of the main computer body, the microcomputer 20 receives a low level signal from the LCD on/off switch 10 and generates a control signal and an interrupt signal.

When the LCD controller 30 receives the control signal from the microcomputer 20, it allows the LCD back-light section to be turned off Also upon the alarm processor 50 receiving the interrupt signal, it determines whether or not the interrupt signal is a burglar alarm signal and generates a warning alarm if it is the burglar alarm signal.

On the other hand, if a key-input password is provided from the keyboard 15 during the generation of the warning alarm by means of the alarm processor 50, the password determining section 60 compares a previously set password with the key-input password, and generates an interrupt signal if the key-input password is not identical with the previously set password. The interrupt signal from the password determining section 60 is provided to the alarm processor 50 so as to interrupt the generation of the warning alarm. The laptop computer further includes a BIOS set-up modifying section 70 for changing alarm BIOS set-up, hot-key and/or password information by using the key-input information from the keyboard 15.

Figure 4A:
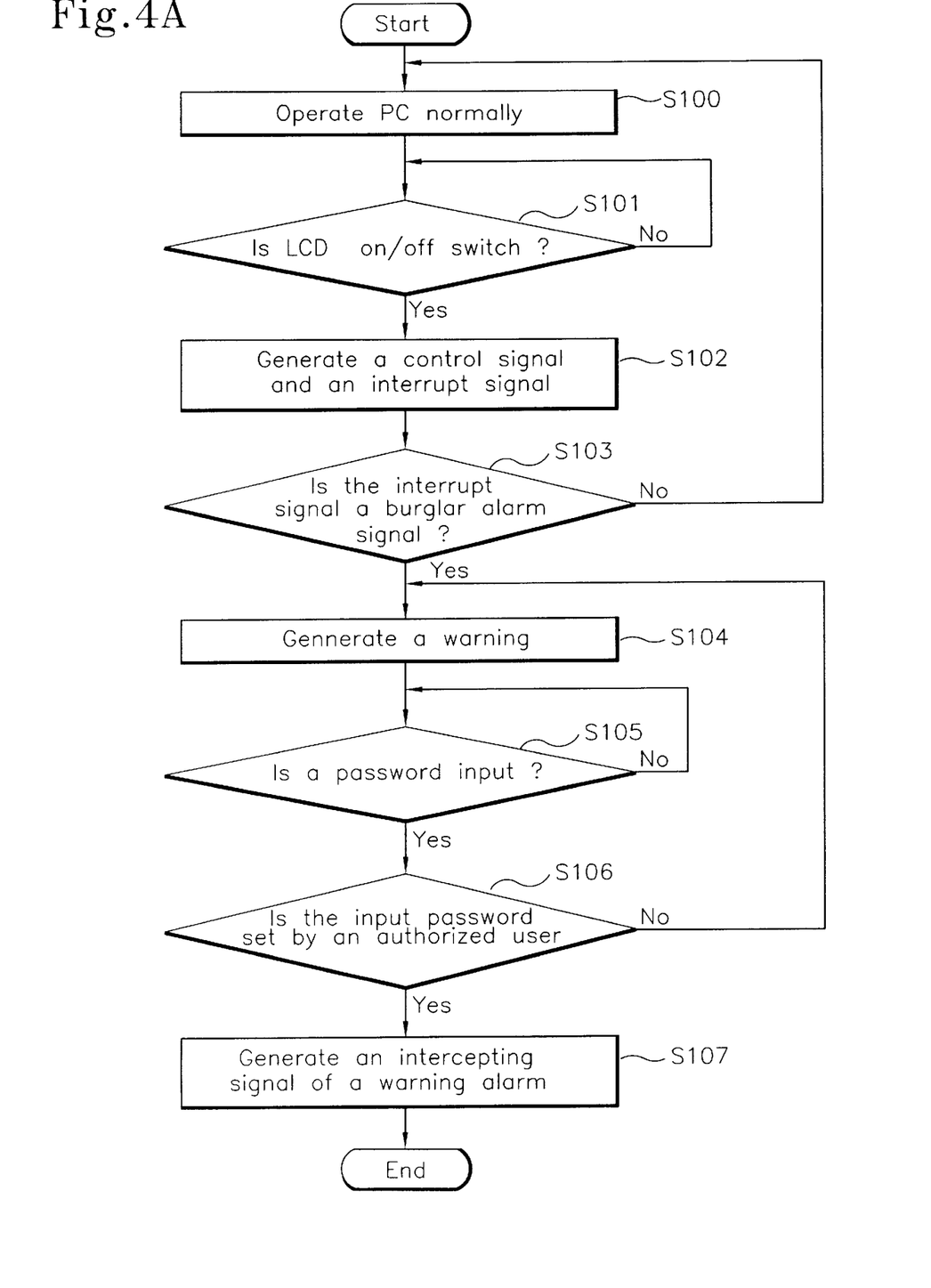
FIG. 4A is a flowchart illustrating a novel method of generating an anti-theft alarm by detecting an unauthorized moving of the laptop computer of FIG. 3 according to the present invention.
Figure 4B:
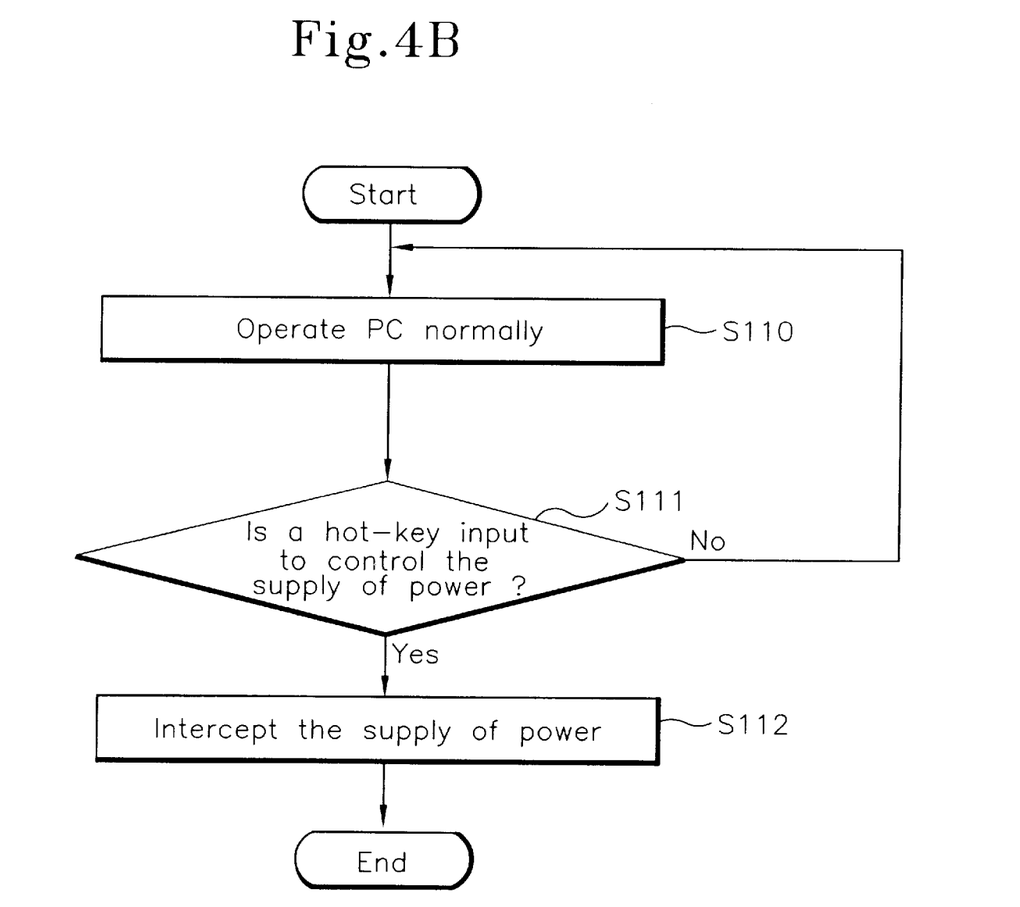
FIG. 4B is a flowchart illustrating that the supply of power to the laptop computer of FIG. 3 is interrupted in accordance with a hot-key input signal during the normal operation thereof.

FIG. 4A illustrates a novel method of generating an anti-theft alarm by detecting an unauthorized moving of the laptop computer of FIG. 3 and FIG. 4B illustrates that the supply of a power to the laptop computer of FIG. 3 is interrupted in accordance with a hot-key input signal during the normal operation thereof With reference to FIG. 4A, at step S100, when the computer is in a normal operating state after the beginning of a booting routine, the control proceeds to step S101 to determine whether the LCD on/off switch 10 is switched on or off If the switch 10 is at on-state, it means that the LCD cover is not completely folded over the main computer body and the LCD back-light section of the LCD cover is turned on. If the switch is off, it is meant that the LCD cover is completely folded over the main computer body and the LCD back-light section thereof is turned off. This case means that the personal computer is being moved against the authorized user's will.

When the switch 10 is off, the control proceeds to step S102 so that the microcomputer 20 simultaneously generates a control signal capable of switching the LCD back-light section off and an interrupt signal. Then the LCD controller 30 interrupts the supply of a power to the LCD back-light section upon receiving the control signal. As a result, the LCD back-light section is turned off. At step S103, the alarm processor 50 determines whether or not the interrupt signal is not a burglar alarm signal, and, when it is a burglar alarm signal, the control proceeds to step S100. If so, at step S104, the alarm processor 50 generates a warning (e.g., an anti-theft alarm) in response to the burglar alarm signal.

In determining whether the interrupt signal is a burglar alarm signal at step S 103, a hot-key for controlling the supply of power is used as a determining factor. In detail, as shown in FIG. 4B, while the personal computer is in a normal operating state (step S110), at step S111 a determination is made as to whether or not a hot-key input signal for controlling the supply of power has been input from the keyboard 15. If so, the control proceeds to step S112 to interrupt the supply of power to the computer. If not, the microcomputer 20 determines the interrupt signal to be a burglar alarm signal.

Turning again to FIG. 4A, during the generation of the anti-theft alarm, at step S105, a determination is made as to whether or not a password has been input from the keyboard. If so, the control proceeds to step S106 where a determination is made as to whether or not the input password is the password set by the authorized user. If so, the control proceeds to step S107 where the password determining section 60 outputs an interrupt signal to the alarm processor 50 for interrupting the generation of the warning alarm. If not, however, the alarm processor 50 generates the burglar alarm signal to allow the warning alarm to continuously be generated.

According to the above described method for controlling an alarm function, the personal computer of the present invention can generate a warning alarm when it is moved to another place against an authorized user's will with the LCD cover folded over the main computer body. Also, during the continuous generation of the warning alarm, the alarm can be interrupted only when the same password previously set by an authorized user has been entered.

Particularly, as shown in FIG. 4B, because the supply of power to the computer of the present invention can be interrupted only by a hot-key input signal from the keyboard during the normal operation thereof, the burglar alarm function cannot be interrupted by the power source switch mounted on the main computer body.

Figure 5:
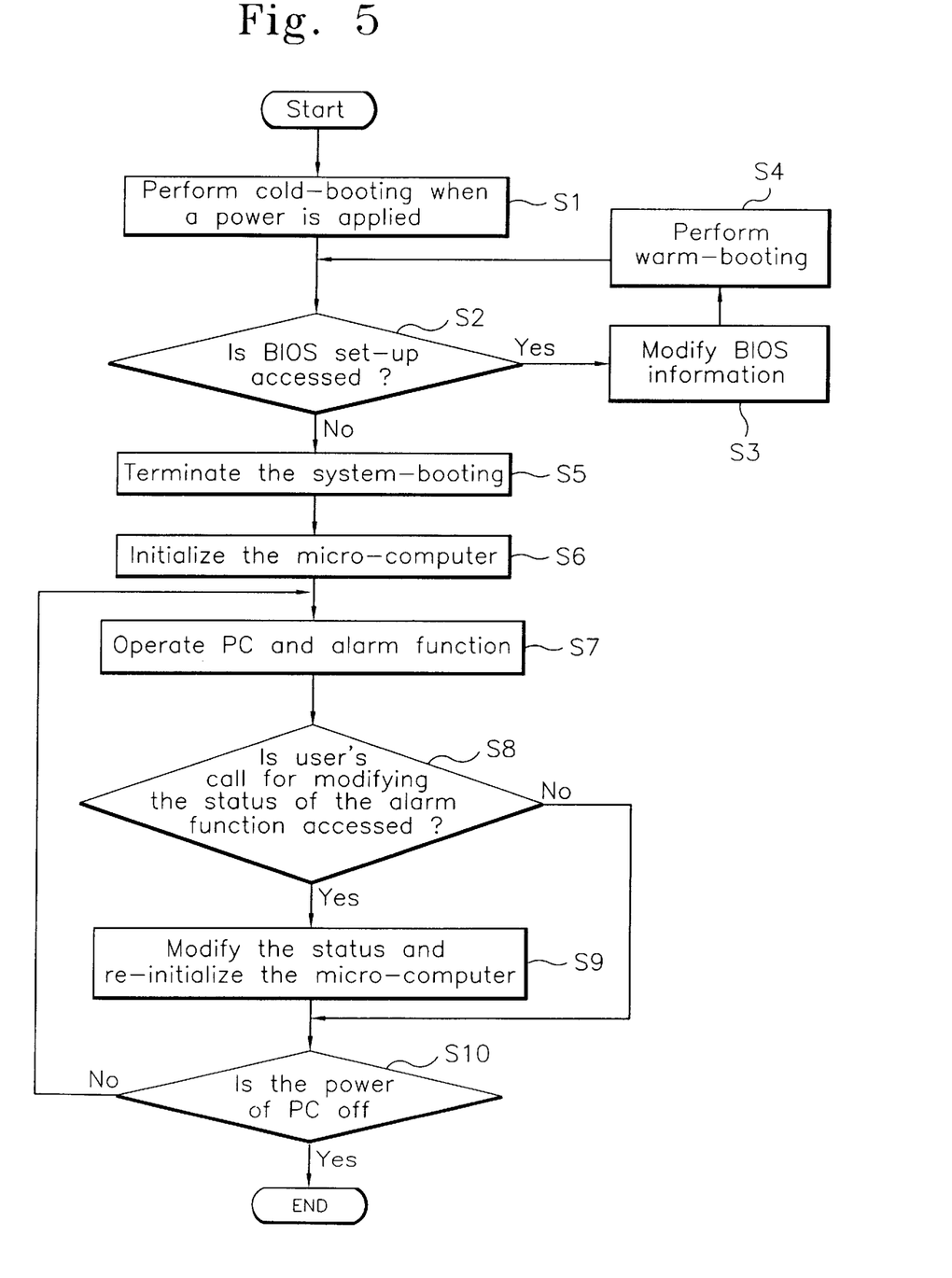
FIG. 5 is a flowchart illustrating an operation of the alarm processor shown in FIG. 3 for modifying the BIOS set-up information.

FIG. 5 illustrates an operation of the alarm processor shown in FIG. 3 for modifying BIOS set-up information.

As shown in FIG. 5, at step S1, when battery power or externally supplied power is supplied to the personal computer by means of the power switch mounted on the main computer body, a cold-booting operation is performed and the control proceeds to step S2. At step S2, a determination is made as to whether or not a BIOS set-up has been accessed. If the BIOS set-up has been accessed, the BIOS set-up modifying section 70 can modify the on/off state of the burglar alarm function. Also, BIOS information, such as an alarm BIOS set-up, a basic hot-key and a password, etc. can then be modified in accordance with the key-input by an authorized user. If the modification of BIOS information is terminated, the control proceeds to step S4 to perform a warm booting operation. When the BIOS set-up has not been accessed, the control proceeds to step S5 to terminate the normal system booting operation. Herein, the on/off of the alarm function means that the alarm function is available or not available in the laptop computer of the present invention.

At step S6, the microcomputer 20 is initialized to reset the status therein. After the initialization of the microcomputer 20, the control proceeds to step S7 to allow both the computer and the alarm function therein to be normally operated, and, at step S8, a determination is made whether or not there is a user's call for modifying the status of the alarm function. If so, at step S9, the status thereof can be changed in accordance with the key-input by an authorized user and then the microcomputer 20 is re-initialized. If not, however, the control proceeds direct to step S10 to determine whether or not the power of the computer has been turned off. If the power is off, the BIOS set-up operation is interrupted. If the power is on, the control jumps to step S7 to make the computer and the alarm function operate normally.

Hereinafter, the anti-theft alarm generating function in the laptop computer will be described with reference to FIGS. 6 and 7.

Figure 6:
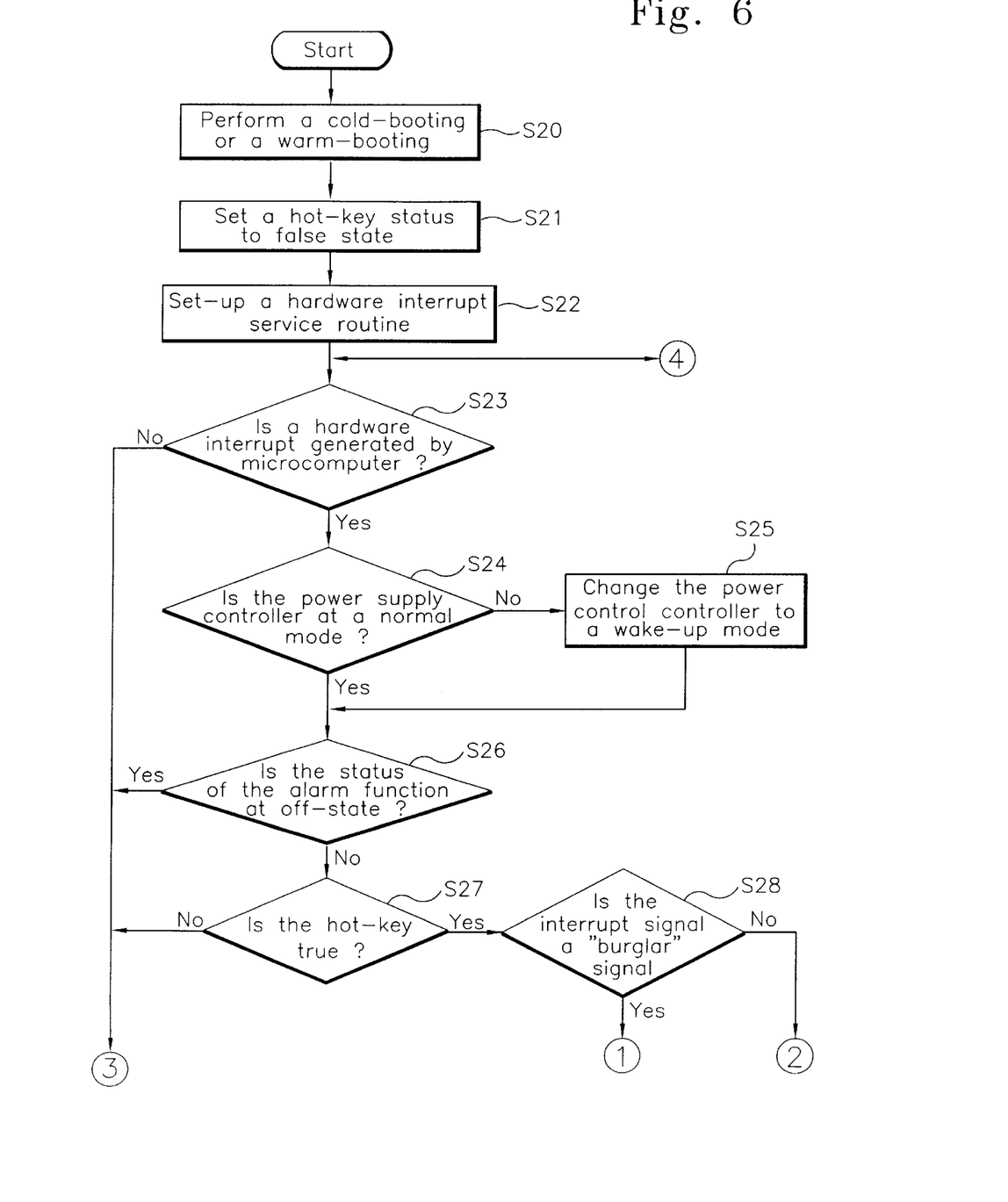
FIGS. 6 and 7 are flowcharts illustrating the anti-theft alarm generating function to be performed in the laptop computer according to the present invention.
Figure 7:
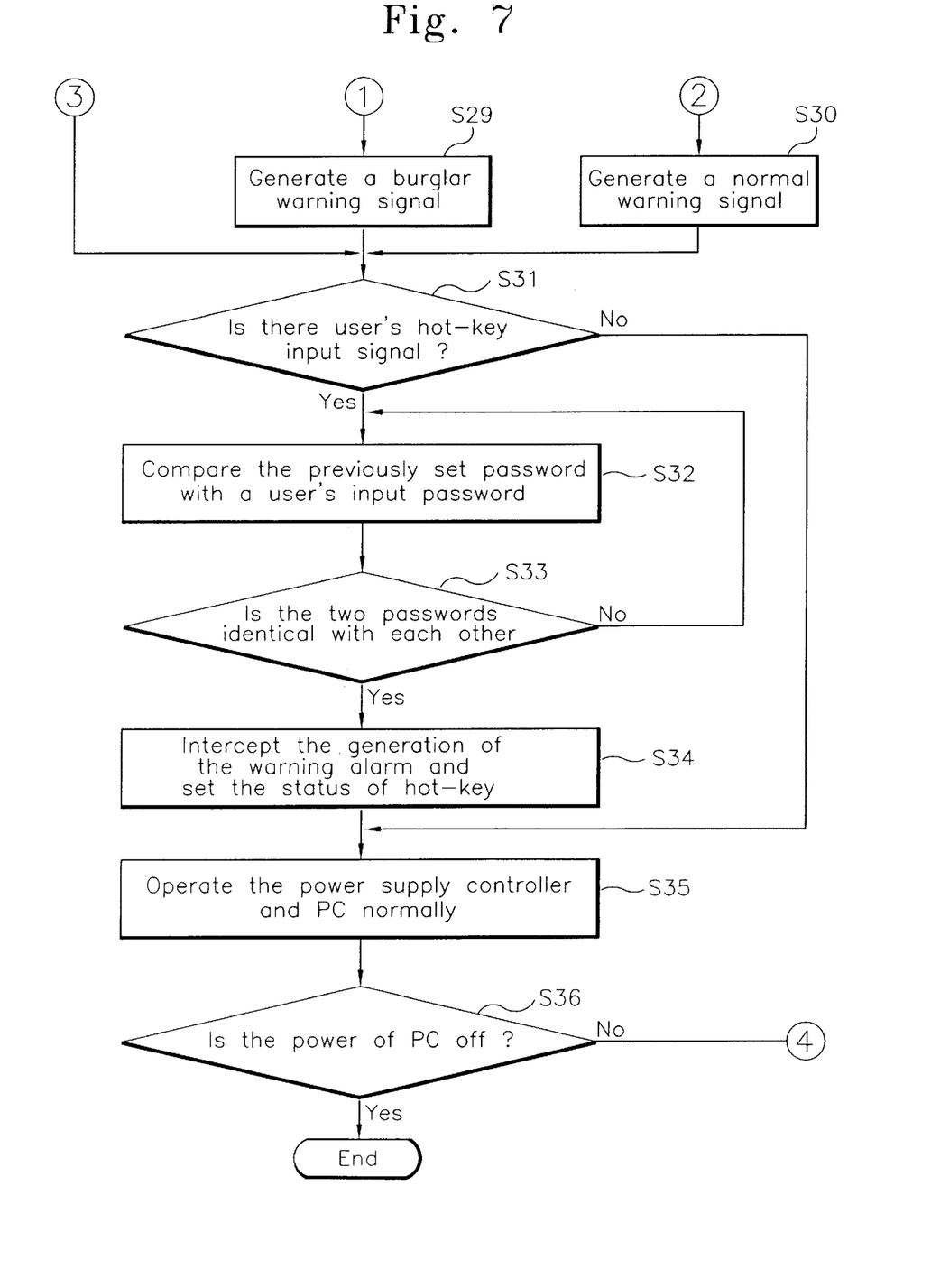

Referring to FIG. 6, a cold-booting or a warm booting is performed at step S20 and a hot-key status is set to a false state at step S21. Then, at step S22, a hardware interrupt service routine for interface is set up. When the set-up operation of the service routine is terminated, the control proceeds to step S23 to determine whether or not a hardware interrupt has been generated by the microcomputer 20.

If so, at step S24, a determination is made as to whether or not the power supply controller 40 shown in FIG. 3 is set to a normal mode. When the power supply controller 40 is in the normal mode, a determination is made at step S26 as to whether or not the alarm function is off. Also, at steps S27 and S28, a determination is made as to whether or not a hot-key status is true and an interrupt signal is a "burglar" interrupt signal.

On the other hand, at step S24, when the power supply controller 40 is not in the normal mode, the control proceeds to step S25 to change the power supply controller mode to a wake-up mode. At steps S26 and S27 when the alarm function is off, and the true state of the hot-key is not found, the control proceeds to step S31 to determine whether or not there is an authorized user's hot-key input signal.

At step S28, if the interrupt signal is the "burglar" interrupt signal, the control proceeds to step S29 to generate a burglar warning alarm. However, if not, the control proceeds to step S30 to generate a normal warning alarm.

During the generation of the warning alarm, at step S31, when there is the authorized user's hot-key input signal, the control proceeds to step S32 to compare a previously set password with a user's key-input password. At step S33, a determination is made as to whether or not the two passwords are identical by means of the password determining section 60. If so, the control proceeds to step S34 to set the status of hot-key in accordance with the key-input by an authorized user and to interrupt the warning alarm. If not, at step S32, the password determining section 60 waits for the key-input of a new password by the user.

After the termination of the warning alarm, the power supply controller 40 and the computer are normally operated at step S35. Next, at step S36, a determination is made as to whether or not the power is off. If so, the operation of the computer is terminated. If not, however, the control jumps to step S23 to check for the presence of a hardware interrupt again.

As described above, a laptop computer with an alarm function according to the present invention can generate a burglar warning alarm when it is moved to another place against an authorized user's will, i.e., when an LCD back-light screen is turned off by an LCD on/off switch.

Also a laptop computer of the present invention can interrupt the generation of the burglar warning alarm only when a key-input password of a user is identical with a previously set password. Accordingly, only the authorized user can interrupt the burglar warning alarm by inputting a password which is the same as the previously set password.

Furthermore, since the laptop computer is constructed in which an LCD back-light switching, password identification and lock functions can be operated so as to be associated with one another, an unauthorized user can not interrupt the generation of the warning, and can not interrupt the supply of power thereto without the input of a specific hot-key.

In the drawings and specification, there have been disclosed typical preferred embodiments of the invention and, although specific terms are employed, they are used in a generic and descriptive sense only and not for the purposes of limitation, the scope of the invention being set forth in the following claims.

What is claimed is:

1. A laptop computer comprising:

a main computer body having a microcomputer contained therein; a keyboard;

a display cover pivotally mounted to said main computer body, for displaying information from said microcomputer;

a display on/off switch for interrupting the supply of power to the display cover when the display cover is pivotally folded over the main computer body;

a first means for receiving an interrupt signal from said microcomputer when said display on/off switch is off, and for determining whether or not said interrupt signal is a burglar alarm signal and for generating a warning when said interrupt signal is determined to be said burglar alarm signal; and a second means for comparing a previously set password with a password entered from said keyboard during the generation of said warning and for determining whether or not the passwords are identical, and for generating a signal to interrupt the generation of the warning when the passwords are determined to be identical and for continuing the generation of the warning when the passwords are determined not to be identical;

said first and second means including:

a means for determining whether or not the display on/off switch is on;

a means for generating a switching on/off signal of the supply power and an interrupt signal from the microcomputer when the switch is on;

a means for determining whether or not the interrupt signal is a signal for interrupting the supply power to the computer;

a means for providing the burglar alarm signal as a warning signal to the alarm processor if the interrupt signal is the burglar alarm signal;

a means for receiving an entered password from the keyboard while generating the warning signal;

a means for determining whether or not the entered password is identical with a previously set password; and a means for supplying a control signal to the alarm processor if the passwords are identical and continuously generating the warning if not, the control signal being a warning interrupt signal to interrupt the generation of the warning.

2. The laptop computer as defined in claim 1, further comprising a BIOS (basic input output system) set-up means for modifying alarm BIOS set-up information, a hot-key and password in accordance with key-input information provided from said keyboard.

3. The laptop computer as defined in claim 1, said display on/off switch comprising a contact portion having two terminals, one terminal being connected to ground and the other terminal being connected to an input port of the microcomputer and, a connection portion which is pushed down upon the display cover being folded over the main computer body to electrically connect said two terminals of the contact portion.

4. The laptop computer as defined in claim 1, said display comprising a liquid crystal display.

5. The laptop computer as defined in claim 2, said display comprising a liquid crystal display.

6. The laptop computer as defined in claim 3, said display comprising a liquid crystal display.

7. A method of controlling an alarm function in a laptop computer having a main computer body with a microcomputer therein and provided with a keyboard, a display cover pivotally mounted to the main computer body, for displaying information from the microcomputer, and a display on/off switch provided to interrupt the supply of power to the display when the display cover is pivotally folded over the main computer body, an alarm processor for receiving an interrupt signal from the microcomputer when the display on/off switch is off, and for determining whether or not the interrupt signal is a burglar alarm signal so as to generate a warning, and for comparing a previously set password with a password entered from the keyboard during the generation of the warning to determine whether or not the passwords are identical, and for generating a signal to interrupt the generation of the warning when the passwords are identical, said method comprising the steps of:

operating the computer normally;

determining whether or not the display on/off switch is on;

generating a switching on/off signal of the display power and an interrupt signal from the microcomputer when the switch is on;

determining whether or not the interrupt signal is a signal for interrupting the supply of power to the computer;

providing the burglar alarm signal as a warning signal to the alarm processor if the interrupt signal is the burglar alarm signal;

receiving an entered password from the keyboard while generating the warning signal;

determining whether or not the entered password is identical with a previously set password; and supplying a control signal to the alarm processor if the passwords are identical and continuously generating the warning if not, the control signal being a warning interrupt signal to interrupt the generation of the warning.

8. The method of controlling an alarm function as defined in claim 7, the step of deciding whether or not the interrupt signal is the burglar alarm signal comprising the step of using a hot-key input signal as a decision factor.

9. The method of controlling an alarm function as defined in claim 7, the step of continuously generating the warning comprising the steps of determining whether the interrupt signal is a normal alarm signal or the burglar alarm signal and generating a warning corresponding to each of the alarm signals.

10. The method of controlling an alarm function as defined in claim 7, further comprising the step of interrupting the supply of the power to the computer only by means of a hot-key input during the normal operation of the computer.

11. The method of controlling an alarm function as defined in claim 10, the step of interrupting the supply of power comprising the steps of:

receiving a hot-key input signal through the keyboard during the normal operation thereof;

determining whether or not the hot-key input signal is provided to control the supply of power to the computer;

interrupting the supply of power to the computer if the hot-key input signal is a signal for controlling the supply of power; and determining whether or not the interrupt signal is the burglar alarm signal.

12. A laptop computer comprising:

an LCD on/off switch;

a microcomputer for generating both a control signal for turning on or off an LCD back-light section and an interrupt signal upon switching the switch on or off;

a controller for turning on or off the LCD back-light section in response to the control signal from the microcomputer;

a power supply controller for supplying power to a main computer body of the laptop computer and an LCD screen and for changing from a previous power mode to a power saving mode, or from a power saving mode to a previous power mode in response to the control signal from the microcomputer;

an alarm processor for determining whether or not the interrupt signal is a burglar alarm signal and for generating a warning a if the interrupt signal is determined to be the burglar alarm signal; and a password determining section for comparing a previously set password with a new password entered from a keyboard during the generation of the warning alarm and for interrupting the generation of the warning alarm only when the new password is determined to be identical with the previously set password.

* * * * *